US012725312B2

(12) United States Patent
Takeda

(10) Patent No.: US 12,725,312 B2
(45) Date of Patent: Sep. 1, 2026

(54) REPRODUCTION APPARATUS, GENERATION APPARATUS, CONTROL METHOD, AND RECORDING MEDIUM

(71) Applicant: CANON KABUSHIKI KAISHA, Tokyo (JP)

(72) Inventor: Eishi Takeda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 144 days.

(21) Appl. No.: 18/630,009

(22) Filed: Apr. 9, 2024

(65) Prior Publication Data

US 2024/0354998 A1 Oct. 24, 2024

(30) Foreign Application Priority Data

Apr. 21, 2023 (JP) ................................ 2023-070435

(51) Int. Cl.

*G06T 9/00* (2006.01)
*G06F 3/01* (2006.01)
*G06T 15/20* (2011.01)
*G06T 17/00* (2006.01)
*G06T 19/20* (2011.01)

(52) U.S. Cl.

CPC ................ *G06T 9/00* (2013.01); *G06F 3/013* (2013.01); *G06T 15/20* (2013.01); *G06T 17/00* (2013.01); *G06T 19/20* (2013.01); *G06T 2210/56* (2013.01); *G06T 2219/2016* (2013.01)

(58) Field of Classification Search

CPC ........... G06T 9/00; G06T 15/20; G06T 17/00; G06T 19/20; G06T 2210/56; G06T 2219/2016; G06F 3/013

See application file for complete search history.

(56) References Cited

U.S. PATENT DOCUMENTS 11,367,247 B2 * 6/2022 Thudor .................. G06T 15/04
2017/0238000 A1 * 8/2017 Ryu .................... H04N 19/119 375/240.02
2020/0092584 A1 * 3/2020 Cai ...................... H04N 19/62
2021/0192681 A1 * 6/2021 Mironov .................. G06T 5/80
2022/0368858 A1 * 11/2022 Valli .................. G02B 27/017

FOREIGN PATENT DOCUMENTS

JP 2012080294 A * 4/2012 .......... H04N 13/341
WO WO-2022224964 A1 * 10/2022 .......... H04N 21/258

* cited by examiner

*Primary Examiner* — Xin Sheng
(74) *Attorney, Agent, or Firm* — Cowan, Liebowitz & Latman, P.C.

(57) ABSTRACT

A reproduction apparatus reproduces encoded data in which point cloud information pertaining to a pixel distributed in a three-dimensional space is compressed and encoded. The apparatus obtains the encoded data and information pertaining to reproduction of the encoded data, executes decoding processing on the encoded data and generates a three-dimensional video from the encoded data based on a decoding result. The information includes first information pertaining to a viewing distance of the reproduction, and second information different from the first information. The decoding processing is changed according to the first information and the second information.

25 Claims, 12 Drawing Sheets

FIG. 5A
501 310 321 502
FIG. 5B
501 310 321 502
FIG. 5C
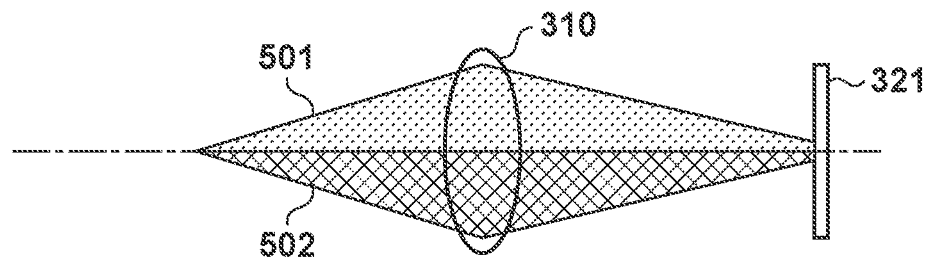
FIG. 6
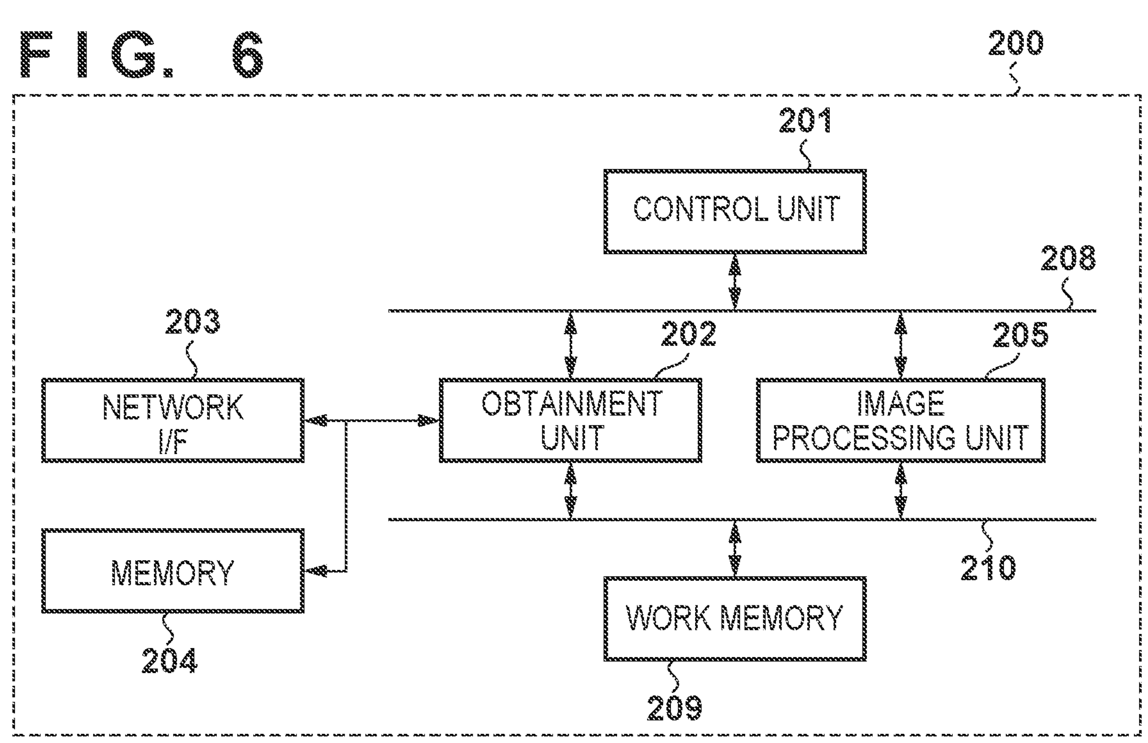

POINT CLOUD-COMPRESSED BITSTREAM
ATLAS SPS
POINT CLOUD-COMPRESSED AU (ACCESS UNIT)
SEI
POINT CLOUD-COMPRESSED AU
...
SEI
POINT CLOUD-COMPRESSED AU
710
700
y
z
x
ATLAS
OCCUPANCY MAP INFORMATION
GEOMETRY INFORMATION
ATTRIBUTE INFORMATION
701
702
703
Front
Back
Right
Left
Top
Bottom
FR
BK
R
L
T
B
FR
BK
R
L
T
B

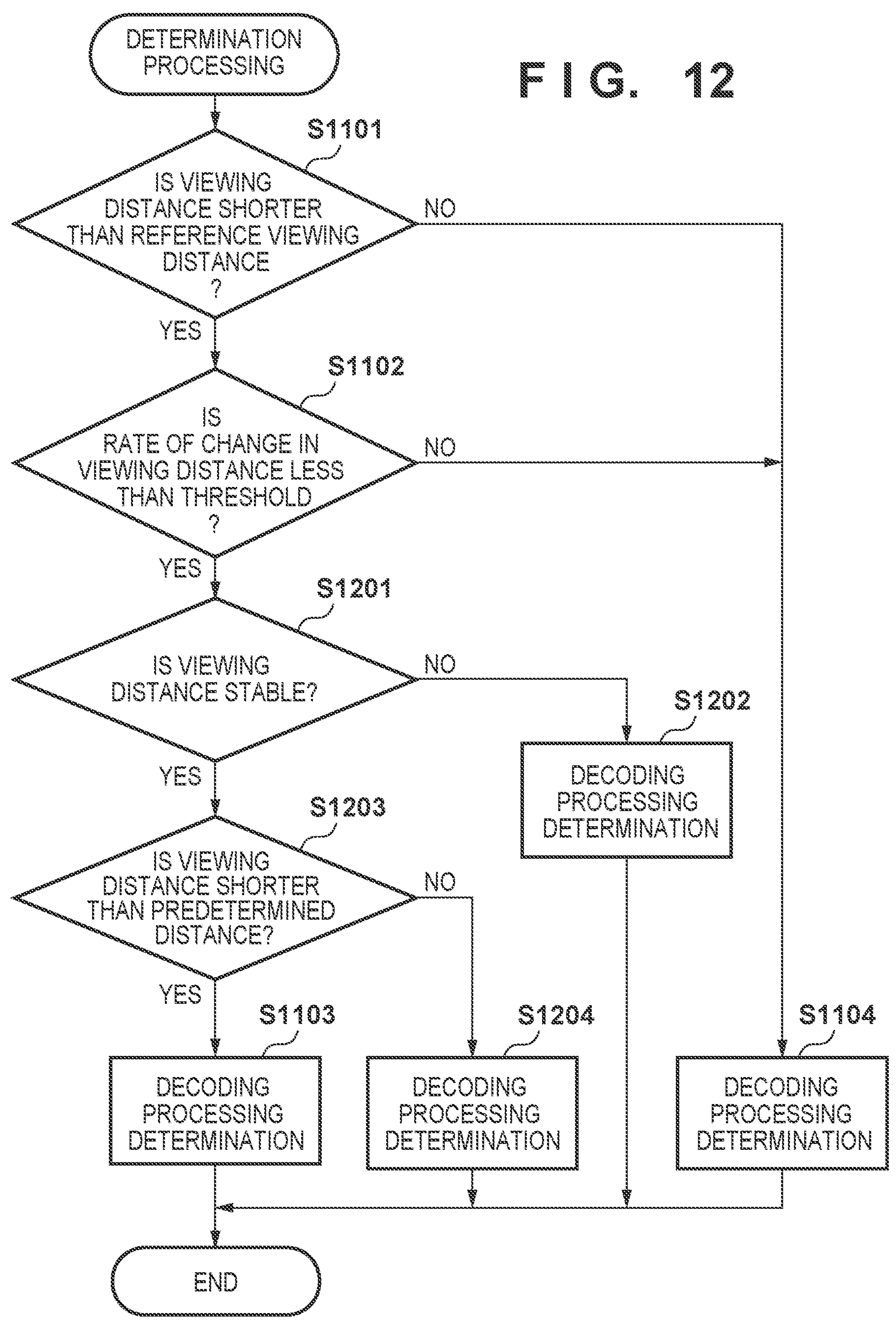
FIG. 12
DETERMINATION PROCESSING
S1101
IS VIEWING DISTANCE SHORTER THAN REFERENCE VIEWING DISTANCE ?
NO
YES
S1102
IS RATE OF CHANGE IN VIEWING DISTANCE LESS THAN THRESHOLD ?
NO
YES
S1201
IS VIEWING DISTANCE STABLE?
NO
YES
S1202
DECODING PROCESSING DETERMINATION
S1203
IS VIEWING DISTANCE SHORTER THAN PREDETERMINED DISTANCE?
NO
YES
S1103
DECODING PROCESSING DETERMINATION
S1204
DECODING PROCESSING DETERMINATION
S1104
DECODING PROCESSING DETERMINATION
END

REPRODUCTION APPARATUS, GENERATION APPARATUS, CONTROL METHOD, AND RECORDING MEDIUM

BACKGROUND OF THE INVENTION

Field of the Invention

The present invention relates to a reproduction apparatus, a generation apparatus, a control method, and a recording medium, and particularly relates to a technique for generating an image corresponding to a specific viewpoint using an image group in which a subject has been shot from a plurality of viewpoints.

Description of the Related Art

A video processing technique is known which emphasizes the sense that an object is popping out in three-dimensional video according to an amount of movement when an observer viewing the three-dimensional video moves closer (Japanese Patent Laid-Open No. 2012-080294).

Incidentally, instead of a technique which provides three-dimensional video limited to the range displayed by a display device as in Japanese Patent Laid-Open No. 2012-080294, techniques which use various methods to provide video according to a viewpoint freely selected by an observer are becoming more common in recent years. For example, using images shot by a plurality of image capturing apparatuses placed throughout the entire circumference of a subject makes it possible for an observer to view the subject from a viewpoint the observer has selected as desired.

To provide such free-viewpoint video as streamed video or a television broadcast, it is necessary to compress and encode information of a plurality of images for each frame. To that end, the MPEG-I (Immersive) standard is in the process of being standardized. The MPEG-I standard employs a method known as Video Point Cloud Coding (V-PCC), in which pixels pertaining to the same subject in a plurality of images are associated with each other, the pixels on the surface of the subject are converted into point cloud information distributed throughout a three-dimensional space, and that information is then compressed and encoded. More specifically, the point cloud information is projected onto each of surfaces of a bounding box, broken down into two-dimensional images for texture, geometry, and occupancy for each surface, and then compressed and encoded.

On the other hand, to reproduce free-viewpoint video, it is necessary for each reproduction apparatus to decode the compressed data of the encoded point cloud information and configure three-dimensional data pertaining to the subject, and then render the three-dimensional data in the three-dimensional space. This is expected to increase the amount of computation pertaining to the rendering each time the data is reproduced.

SUMMARY OF THE INVENTION

The present invention provides a reproduction apparatus, a generation apparatus, a control method, and a recording medium that reduce a computational load involved in reproduction while ensuring a suitable viewing experience when reproducing encoded data in which point cloud information is compressed and encoded.

The present invention in its second aspect provides a reproduction apparatus that reproduces encoded data in which point cloud information pertaining to a pixel distributed in a three-dimensional space is compressed and encoded, the reproduction apparatus comprising: at least one processor and/or circuit; and at least one memory storing a computer program which causes the at least one processor and/or circuit to function as the following units: a first obtainment unit configured to obtain the encoded data; a second obtainment unit configured to obtain information pertaining to reproduction of the encoded data; a decoding unit configured to execute decoding processing on the encoded data; and a generation unit configured to generate a three-dimensional video from the encoded data based on a decoding result from the decoding unit, wherein the information pertaining to reproduction includes first information pertaining to a viewing distance of the reproduction, and second information different from the first information, and the decoding processing performed by the decoding unit is changed according to the first information and the second information obtained by the second obtainment unit.

The present invention in its third aspect provides a generation apparatus that generates encoded data in which point cloud information pertaining to a pixel distributed in a three-dimensional space is compressed and encoded, the generation apparatus comprising: at least one processor and/or circuit; and at least one memory storing a computer program which causes the at least one processor and/or circuit to function as the following units: a first obtainment unit configured to obtain the point cloud information; an encoding unit configured to compress and encode the point cloud information obtained by the first obtainment unit; a second obtainment unit configured to obtain information pertaining to reproduction of the encoded data; and a generation unit configured to generate the encoded data including the point cloud information compressed and encoded by the encoding unit and the information pertaining to reproduction obtained by the second obtainment unit, wherein the information pertaining to reproduction includes (i) information on a reference viewing distance predefined for the reproduction of the encoded data and (ii) information different from the reference viewing distance.

The present invention in its fourth aspect provides a method for controlling a reproduction apparatus that reproduces encoded data in which point cloud information pertaining to a pixel distributed in a three-dimensional space is compressed and encoded, the method comprising: obtaining the encoded data; obtaining information pertaining to reproduction of the encoded data; executing decoding processing on the encoded data; and generating three-dimensional video from the encoded data based on a decoding result, wherein the information pertaining to reproduction includes first information pertaining to a viewing distance of the reproduction, and second information different from the first information, and the decoding processing is changed according to the first information and the second information obtained.

The present invention in its fifth aspect provides a computer-readable recording medium on which is recorded a program for causing a computer to execute the method of controlling a reproduction apparatus of the third aspect.

The present invention in its sixth aspect provides a computer-readable recording medium on which is recorded a program for causing a computer to execute the method of controlling a generation apparatus of the fourth aspect.

Further features of the present invention will become apparent from the following description of exemplary embodiments (with reference to the attached drawings).

BRIEF DESCRIPTION OF THE DRAWINGS

FIGS. 5A, 5B, and 5C are other diagrams illustrating the principles of rangefinding performed using the image capturing unit 304 according to embodiments and variations of the present invention.

FIG. 6 is a block diagram illustrating an example of the functional configuration of a generation apparatus 200 according to embodiments and variations of the present invention.

FIG. 12 is a flowchart illustrating an example of determination processing executed by the reproduction apparatus 100 according to a first variation of the present invention.

DESCRIPTION OF THE EMBODIMENTS

First Embodiment

Figure 1:
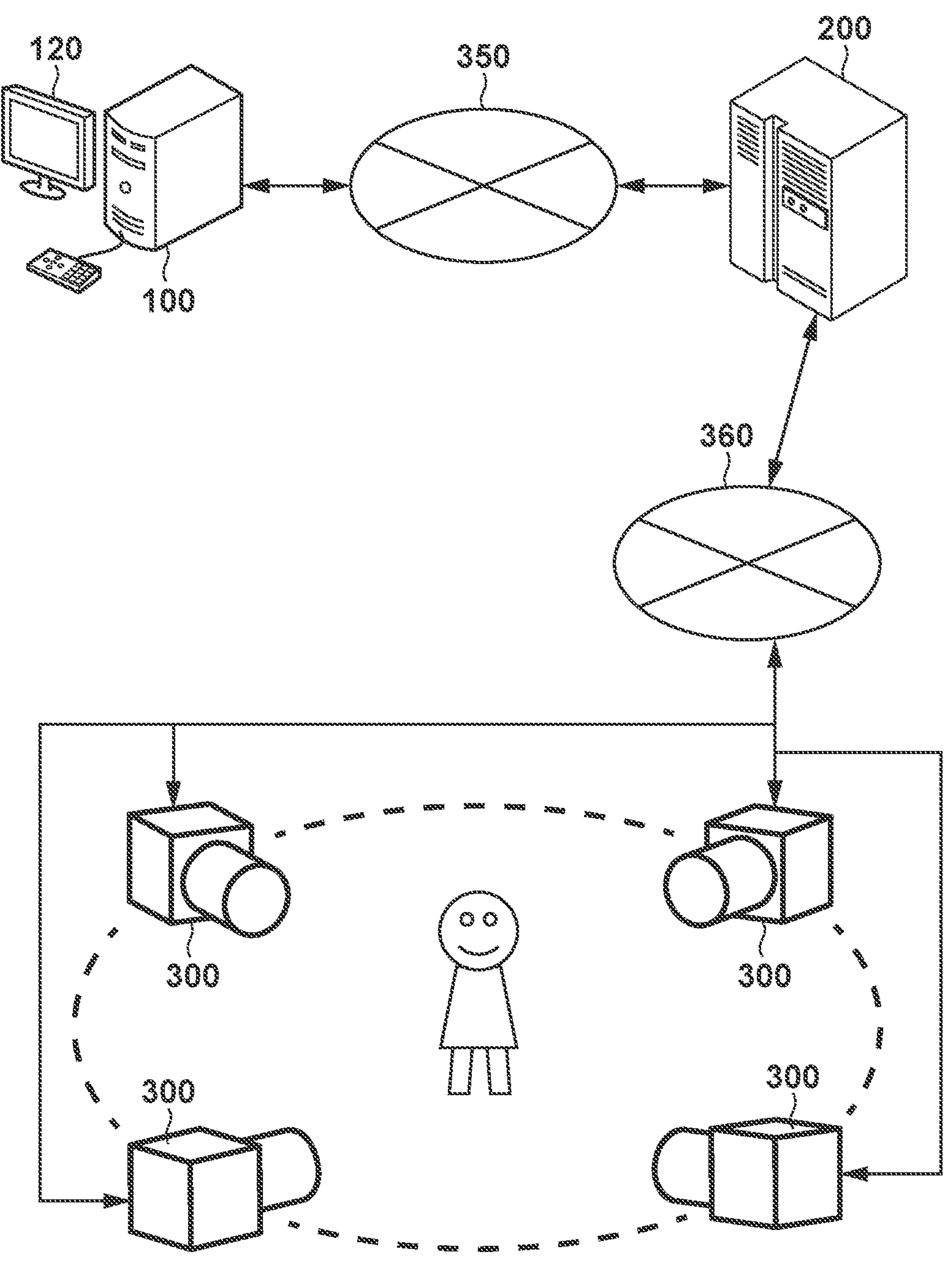
FIG. 1 is a diagram illustrating an example of the configuration of a reproduction system according to embodiments and variations of the present invention.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

The following embodiment will describe an example in which the present invention is applied in a reproduction apparatus capable of decoding encoded data, which has been obtained by compressing and encoding point cloud information, and reproducing three-dimensional video pertaining to the encoded data, as one example of a reproduction apparatus. However, the present invention can be applied in any device capable of adaptively switching the details of processing when decoding encoded data which has been obtained by compressing and encoding point cloud information.

In the present specification, "encoded data" refers to data obtained by using the V-PCC technique standardized by MPEG-I to encode groups of pixels mapped to a three-dimensional space in accordance with the shape of a subject, based on an image group obtained by shooting the subject from a plurality of viewpoints. Each pixel distributed throughout the three-dimensional space according to the shape of the subject indicates the spatial position and color of the corresponding external part of the subject, and such a pixel group may be referred to simply as "point cloud information" hereinafter.

Reproduction System Configuration

FIG. 1 is a system diagram illustrating an example of the configuration of a reproduction system according to the present embodiment. As illustrated in FIG. 1, the reproduction system is configured including a generation apparatus 200 that generates encoded data, and a reproduction apparatus 100 that receives the encoded data from the generation apparatus 200, decodes the encoded data, and reproduces the resulting data as three-dimensional video. The generation apparatus 200 is communicatively connected to a plurality of image capturing apparatuses 300, which are installed at different positions and shoot images used to generate point cloud information. The communication connection between the generation apparatus 200 and the reproduction apparatus 100, and between the generation apparatus 200 and each image capturing apparatus 300, is established over a network 350 and a network 360, which may be LANs, WANs, or the like, for example. In the example illustrated in FIG. 1, these communication connections are established over separate networks, but may be established over the same network. The communication connections can be wired or wireless.

Although not described in the present embodiment, the generation apparatus 200 controls the plurality of connected image capturing apparatuses 300 to shoot images in synchronization, obtains shot images at a plurality of viewpoints from the corresponding image capturing apparatuses 300, and configures the point cloud information. Details will be given later, but each image capturing apparatus 300 is also configured to be capable of outputting distance information in the depth direction for objects present in a shooting range in order to specify the spatial position of each pixel present in a shot image. The present embodiment assumes that the distance information is generated by the image capturing apparatus 300 and transmitted to the generation apparatus 200 along with the shot image.

Functional Configuration of Image Capturing Apparatus

Figure 2:
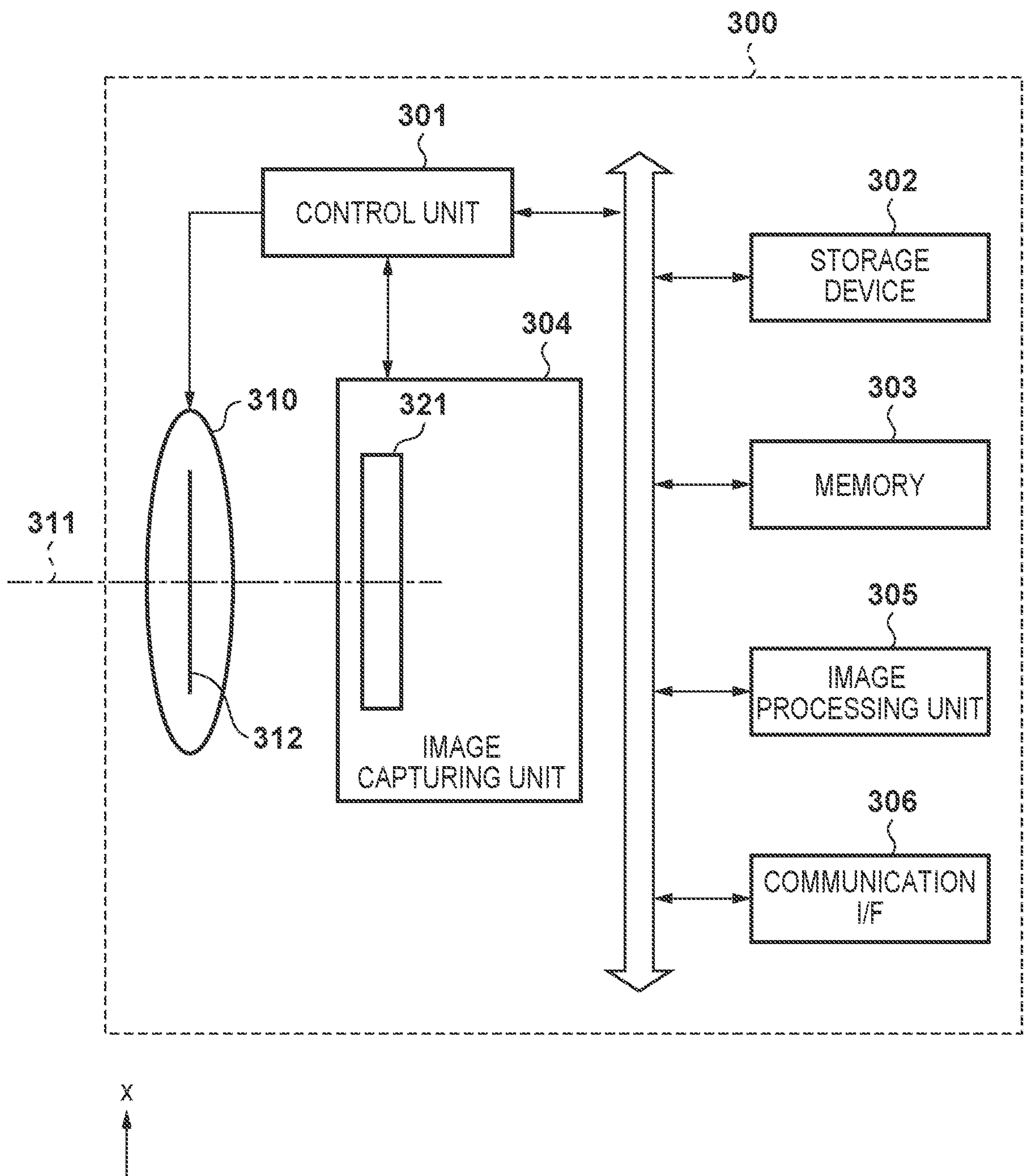
FIG. 2 is a block diagram illustrating an example of the functional configuration of an image capturing apparatus 300 according to embodiments and variations of the present invention.

The functional configuration of the image capturing apparatus 300 according to the present embodiment will be described in detail here with reference to the block diagram in FIG. 2.

A control unit 301 is a control device, such as a CPU, a microprocessor, or the like, that controls the operations of the blocks in the image capturing apparatus 300. To be more specific, the control unit 301 reads out operation programs for each of the blocks, stored in a storage device 302, for example, loads the programs into a memory 303, and executes the programs to control the operations of those blocks.

The storage device 302 is a non-volatile memory, for example, and stores parameters and the like necessary for the blocks to operate in addition to the operation programs of the blocks. Meanwhile, the memory 303 is a recording device such as a volatile memory or the like used for a work region, temporary information storage, or the like. The memory 303 is used not only as a region for loading the operation programs, application programs, and the like, but also as a storage region for data outputted in the operations of the blocks, various types of data required for the operations of the blocks, and the like. The memory 303 is also assumed to store information of various settings of the image capturing apparatus 300 when capturing images (image capturing condition information), parameters pertaining to processing to be applied, and the like.

An image capturing unit 304 includes an image sensor 321 such as, for example, a CCD (charge-coupled device), a CMOS (complementary metal oxide semiconductor) sensor, or the like. The image capturing unit 304 photoelectrically converts an optical image formed on an image capturing plane of the image sensor 321 through an optical imaging system 310, and outputs an analog image signal. The output analog image signal is A/D-converted by an A/D conversion unit (not shown) and is output as a digital image signal.

Here, the optical imaging system 310 is an image capturing lens provided in the image capturing apparatus 300, and forms an optical image of a subject on the image capturing plane of the image sensor 321. The optical imaging system 310 may be constituted by a plurality of lenses (not shown) arranged on an optical axis 311, and includes an exit pupil 312 at a position a predetermined distance from the image sensor 321. Note that the present specification defines the direction parallel to the optical axis 311 as a z direction or a depth direction, the direction orthogonal to the optical axis 311 and parallel to the horizontal direction of the image sensor 321 as an x direction, and the direction parallel to the vertical direction of the image sensor 321 as the y direction, or provides such axes.

In the present embodiment, the image capturing unit 304 also functions as a means for obtaining distance information on the subject present in an image capturing range. Here, the distance information is information indicating the three-dimensional shape of the subject, but is assumed in the present embodiment to be two-dimensional information holding a distance from the image capturing apparatus 300 to the subject (a subject distance) for each pixel in the shot image (this may also be referred to as a "depth image" or "asperity information"). In order to obtain the distance information in an image processing unit 305 (described later), the image sensor 321 is configured to be capable of obtaining an image group used for rangefinding through the image plane-based phase-detection rangefinding method.

Detailed Configuration of Image Sensor

Figure 3A:
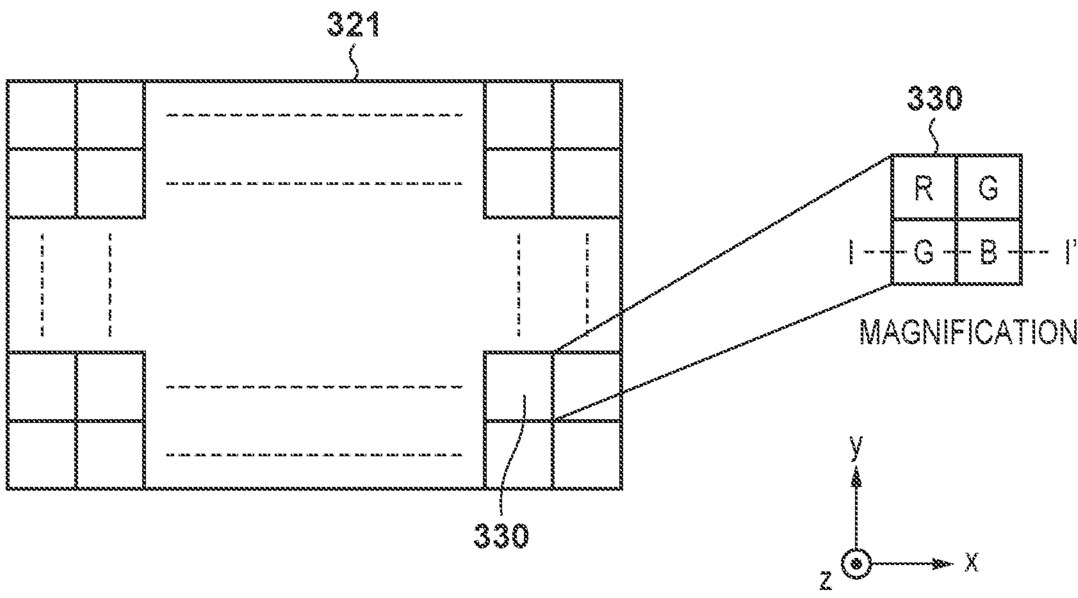
FIGS. 3A and 3B are diagrams illustrating, in detail, the configuration of an image sensor provided in an image capturing unit 304 according to embodiments and variations of the present invention.
Figure 3B:
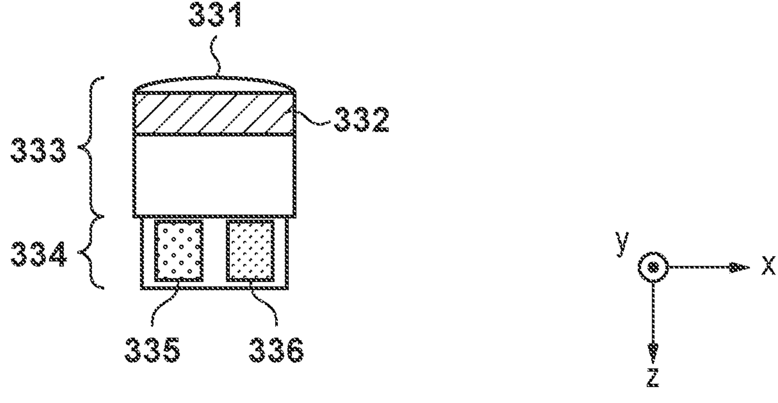

FIGS. 3A and 3B illustrate the configuration of the image sensor 321 in detail. As illustrated in FIG. 3A, the image sensor 321 is constituted by a plurality of pixel groups 330, each having two rows and two columns, to which different color filters have been applied, and which are connected in an array. As illustrated in the enlarged view, each pixel group 330 has red (R), green (G), and blue (B) color filters arranged, and an image signal indicating color information of either R, G, or B is output from each pixel (photoelectric conversion element). Although the present embodiment describes the color filters as being in a distributed form such as that illustrated, it is easy to understand that the present invention is not limited thereto.

To implement the image plane-based phase-detection rangefinding function of the image sensor 321 of the present embodiment, a single pixel (photoelectric conversion element) is constituted by a plurality of photoelectric conversion units arranged side by side in the I-I' cross-section of FIG. 3A, which follows the horizontal direction of the image sensor 321. As illustrated in FIG. 3B, each pixel in the image sensor 321 is constituted by a light guide layer 333 including a microlens 331 and a color filter 332, and a light receiving layer 334 including a first photoelectric conversion unit 335 and a second photoelectric conversion unit 336.

In the light guide layer 333, the microlens 331 is configured to efficiently guide light beams incident on a pixel to the first photoelectric conversion unit 335 and the second photoelectric conversion unit 336. The color filter 332 transmits light in a predetermined wavelength band, and transmits only light in one of the aforementioned R, G, or B wavelength bands, guiding that light to the first photoelectric conversion unit 335 and the second photoelectric conversion unit 336 in the later stages.

The light receiving layer 334 is provided with two photoelectric conversion units (the first photoelectric conversion unit 335 and the second photoelectric conversion unit 336), which convert the received light into analog image signals, and two types of signals output from these two photoelectric conversion units are used for rangefinding. In other words, each pixel of the image sensor 321 has two photoelectric conversion units arranged in the same horizontal direction, and an image signal constituted by the signals output from the first photoelectric conversion unit 335 of all the pixels, and an image signal constituted by the signals output from the second photoelectric conversion unit 336 of all the pixels, are used. In other words, the first photoelectric conversion unit 335 and the second photoelectric conversion unit 336 each partially receives the light beams incident on the pixels through the microlens 331. Accordingly, the set of image signals ultimately obtained is a pupil-divided image group pertaining to light beams that have passed through different pupil regions of the exit pupil of the optical imaging system 310. In other words, the image sensor 321 of the present embodiment is configured to be capable of capturing an image from light beams that have passed through different pupil regions of the optical imaging system 310 separate from each other. Here, a combination of the image signals obtained from the photoelectric conversion by the first photoelectric conversion unit 335 and the second photoelectric conversion unit 336 in each pixel is equivalent to an image signal for viewing output from a single photoelectric conversion unit in a form in which only one photoelectric conversion unit is provided in the pixel.

Having such a structure makes it possible for the image sensor 321 of the present embodiment to output an image signal for viewing and an image signal for rangefinding (two types of pupil-divided images). Although the present embodiment describes all of the pixels in the image sensor 321 as having two photoelectric conversion units configured to be capable of outputting high-density depth information, the present invention is not limited thereto. For example, three or more photoelectric conversion units may be provided in each pixel, or pixels provided with a plurality of photoelectric conversion units may be limited to a part of the pixel group 330.

Principles of Rangefinding

Figure 4A:
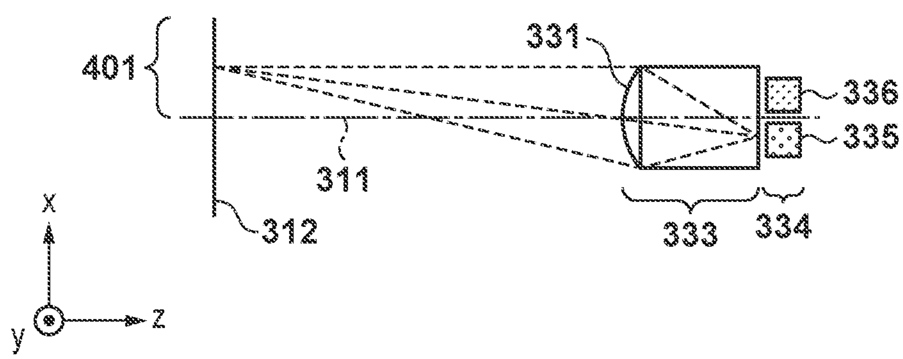
FIGS. 4A and 4B are diagrams illustrating the principles of rangefinding performed using the image capturing unit 304 according to embodiments and variations of the present invention.
Figure 4B:
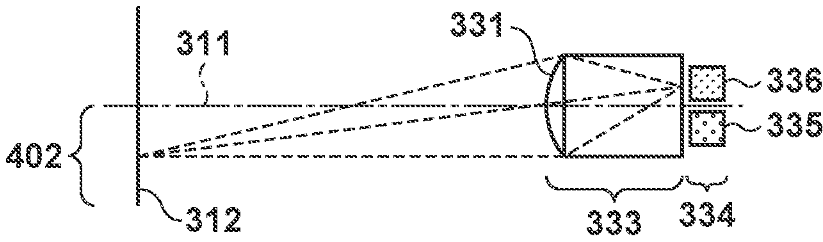

Next, the principles of measuring the subject distance based on the pupil-divided image group output from the first photoelectric conversion unit 335 and the second photoelectric conversion unit 336, which are used to configure the distance information in the image processing unit 305, will be described with reference to FIGS. 4A, 4B, 5A, 5B, and 5C. FIG. 4A is a schematic diagram illustrating the exit pupil 312 in the optical imaging system 310, and a light beam received by the first photoelectric conversion unit 335 of a pixel in the image sensor 321. FIG. 4B is a schematic diagram illustrating a light beam received by the second photoelectric conversion unit 336 in the same manner.

The microlens 331 illustrated in FIGS. 4A and 4B is disposed such that the exit pupil 312 and the light receiving layer 334 are in an optically conjugate relationship. The light beam passing through the exit pupil 312 of the optical imaging system 310 is focused by the microlens 331 and guided to the first photoelectric conversion unit 335 or the second photoelectric conversion unit 336. At this time, the light beams passing through the different pupil regions are mainly received by the first photoelectric conversion unit 335 and the second photoelectric conversion unit 336, respectively, as illustrated in FIGS. 4A and 4B. The light beam passing through a first pupil region 401 is received by the first photoelectric conversion unit 335, and the light beam passing through a second pupil region 402 is received by the second photoelectric conversion unit 336.

The plurality of first photoelectric conversion units 335 provided in the image sensor 321 mainly receive the light beam passing through the first pupil region 401, and output first image signals. At the same time, the plurality of second photoelectric conversion units 336 provided in the image sensor 321 mainly receive the light beam passing through the second pupil region 402, and output second image signals. An intensity distribution of the image formed on the image sensor 321 by the light beams passing through the first pupil region 401 can be obtained from the first image signals. Likewise, an intensity distribution of the image formed on the image sensor 321 by the light beams passing through the second pupil region 402 can be obtained from the second image signals.

The amount of relative positional shift between the first image signals and the second image signals (what is known as a "parallax amount") is a value based on a defocus amount. The relationship between the parallax amount and the defocus amount will be described with reference to FIGS. 5A, 5B, and 5C. FIGS. 5A, 5B, and 5C are schematic diagrams illustrating a relationship between the image sensor 321 and the optical imaging system 310 of the present embodiment. Reference sign 501 in these drawings indicates a first light beam passing through the first pupil region 401, and reference sign 502 indicates a second light beam passing through the second pupil region 402.

FIG. 5A illustrates an in-focus state in which the first light beam 501 and the second light beam 502 converge on the image sensor 321. At this time, the parallax amount between the first image signal formed by the first light beam 501 and the second image signal formed by the second light beam 502 is 0. FIG. 5B illustrates a state of defocus in the negative direction of the z-axis on the image side. At this time, the parallax amount between the first image signal formed by the first light beam 501 and the second image signal formed by the second light beam 502 is not 0, but rather has a negative value. FIG. 5C illustrates a state of defocus in the positive direction of the z-axis on the image side. At this time, the parallax amount between the first image signal formed by the first light beam 501 and the second image signal formed by the second light beam 502 has a positive value. Comparing FIGS. 5B and 5C shows that the direction of the positional shift switches in accordance with whether the defocus amount is positive or negative. Furthermore, it can be seen that the positional shift occurs in accordance with the image formation relationship (geometric relationship) of the optical imaging system 310 according to the defocus amount. The parallax amount, which is the positional shift between the first image signal and the second image signal, can be detected by region-based matching processing.

The image processing unit 305 applies various types of image processing to the shot image obtained by the image capturing unit 304. The image processing unit 305 may be configured as one or more dedicated integrated circuits, or may be a function module implemented by software. The image processing unit 305 performs various types of signal processing such as noise removal, demosaicing, luminance signal conversion, aberration correction, white balance adjustment, color correction, and the like on the captured image signal output from the image sensor 321, and generates image data (a shot image). The image processing unit 305 also performs rangefinding processing based on the principles of rangefinding in the image plane-based phase-detection rangefinding method described above, and configures the distance information corresponding to the shot image.

Although the present embodiment describes the distance information obtained by performing the image plane-based phase-detection rangefinding processing as being output by the image capturing apparatus 300, it goes without saying that the distance information used to configure the point cloud information may be obtained by another method. For example, similar information can be obtained and used by further providing the image capturing apparatus 300 with a Time of Flight (ToF) sensor, or by separately providing a Light Detection And Ranging (LiDAR) device.

A communication I/F 306 is an interface, provided in the image capturing apparatus 300, for establishing a communication connection with an external device. The image capturing apparatus 300 of the present embodiment is connected to the generation apparatus 200, and thus the communication I/F 306 includes an interface for establishing a communication connection with the generation apparatus 200.

Functional Configuration of Generation Apparatus

The functional configuration of the generation apparatus 200 according to the present embodiment will be described in detail next with reference to the block diagram in FIG. 6.

A control unit 201 is a control device, such as a CPU, a microprocessor, or the like, that controls the operations of the blocks in the generation apparatus 200. The control unit 201 includes a storage device such as a ROM, an HDD, or the like (not shown), and a RAM. The control unit 201 reads out operation programs for each of the blocks, stored in a storage device, for example, loads the programs into the RAM, and executes the programs to control the operations of those blocks.

An obtainment unit 202 obtains shot images and distance information pertaining to a plurality of viewpoints, used to generate the point cloud information, and loads the shot images and distance information into a work memory 209, which is a data storage region for work used to configure the point cloud information and generate encoded data. The generation apparatus 200 of the present embodiment receives the shot images and distance information from the plurality of connected image capturing apparatuses 300, and as such, the obtainment unit 202 obtains the received shot images and distance information. Data from the image capturing apparatus 300 is received through a network I/F 203. The network I/F 203 is an interface, provided in the generation apparatus 200, for establishing a communication connection with an external device. The network I/F 203 establishes communication connections with the plurality of image capturing apparatuses 300 over the network 360, and receives shot images and distance information for each viewpoint. When the network I/F 203 receives the shot images and the distance information, that data is stored in a memory 204. Here, the memory 204 is a storage device such as a volatile memory or the like used for temporary information storage. Accordingly, the obtainment unit 202 obtains the shot images and distance information stored in the memory 204.

An image processing unit 205 performs various types of image processing pertaining to the configuration of the point cloud information and the generation of the encoded data. The point cloud information is configured by mapping the pixels pertaining to a main subject in the shot images received from the respective image capturing apparatuses 300 to a three-dimensional space based on the positions and attitudes of the image capturing apparatuses 300 and the distance information. For example, for a main subject located in a shooting environment, the point cloud information which follows the surface of the main subject can be configured by performing the same processing on the shot images obtained from the plurality of image capturing apparatuses 300 placed at positions around the main subject.

Figure 7:
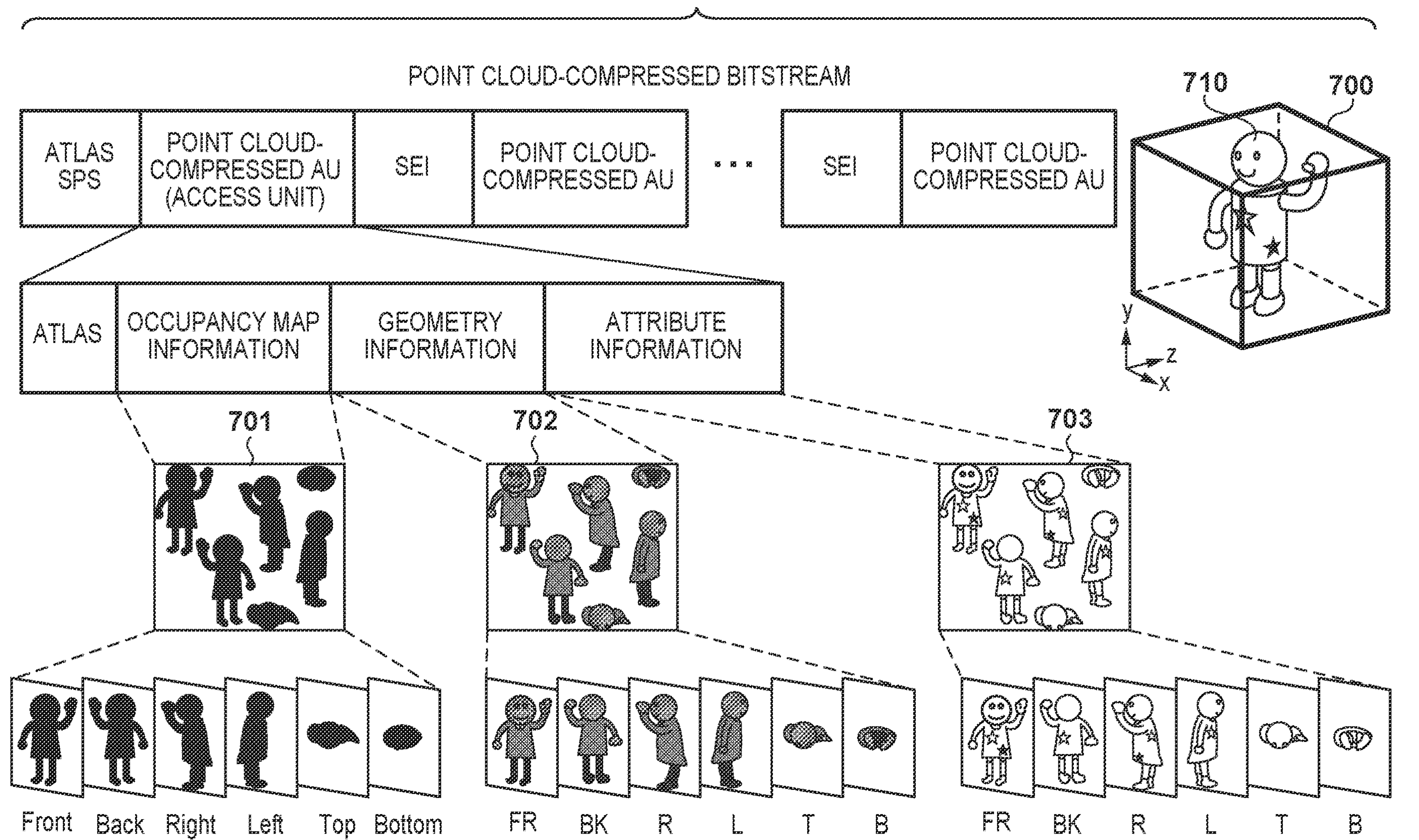
FIG. 7 is a diagram illustrating an example of the configuration of encoded data according to embodiments and variations of the present invention.

The image processing unit 205 also generates a plurality of types of two-dimensional information (partial encoded data) to be encoded, which correspond to a point cloud (pixel group) arranged in the three-dimensional space, for the main subject. The two-dimensional information to be encoded can be generated by projecting a three-dimensional object 710 pertaining to the main subject (called simply an "object" hereinafter) onto each surface of a bounding box 700 of the object 710, as illustrated in FIG. 7. In the present embodiment, the two-dimensional information to be encoded is generated for three types of attributes, namely occupancy map information, geometry information, and attribute information.

The occupancy map information is information indicating positions in the space in the bounding box 700 at which valid pixels are present. In the example in FIG. 7, the occupancy map information is configured as two-dimensional information in which for each surface of the bounding box, black is assigned to projected pixels and no color is assigned to unprojected pixels. In the example illustrated in FIG. 7, the surfaces of the bounding box 700 are indicated as a front surface (FR; front), a back surface (BK; back), a right surface (R; right), a left surface (L; left), a top surface (T; top), and a bottom surface (B; bottom). The image processing unit 205 generates the occupancy map information by projecting a point cloud onto each surface to generate two-dimensional information of the six surfaces, and further combining the point clouds into one instance of two-dimensional information 701.

The geometry information is information indicating unevenness in an outer surface of an object formed by a point cloud. In generating the geometry information, a plane is formed using adjacent point clouds in the point cloud information as vertices, and a distance (depth) to a surface in the normal direction is derived for each pixel in the generated two-dimensional information pertaining to each surface of the bounding box 700. In the example illustrated in FIG. 7, the geometry information is configured as two-dimensional information which indicates the depth in grayscale, for example. The image processing unit 205 generates the two-dimensional information of the six surfaces by projecting a point cloud onto each surface and storing a distance to the corresponding surface for each pixel. The image processing unit 205 also generates the geometry information by combining the generated six types of two-dimensional information into one instance of two-dimensional information 702.

The attribute information indicates a texture to be applied to an object (a three-dimensional model) constituted by forming planes which take point clouds as vertices. As described above, each pixel in the point cloud includes color information, and applying the color information of each pixel to the vertices of a plane formed by the point clouds, for example, makes it possible to determine a color distribution in the plane. Accordingly, the image processing unit 205 can generate two-dimensional information of a texture viewed from each direction by projecting an object having color information, formed by a point cloud, onto each surface of the bounding box 700. The image processing unit 205 generates the attribute information by generating the two-dimensional information pertaining to the textures of the six surfaces and further combining the information into one instance of two-dimensional information 703.

Doing so makes it possible for the image processing unit 205 to convert the point cloud information into three types of two-dimensional information (the occupancy map information, the geometry information, and the attribute information). The image processing unit 205 can also generate encoded data by compressing and encoding this two-dimensional information. FIG. 7 illustrates an example of a compressed bitstream of a point cloud, in which a moving image in which each frame indicates point cloud information is compressed and encoded. The three types of two-dimensional information described above are each compressed and encoded, and are included in a point cloud-compressed access unit (AU) pertaining to a single frame. In other words, the image processing unit 205 compresses and encodes the three types of two-dimensional information generated for one frame to generate the encoded data pertaining to that frame.

A control bus 208 and a data bus 210 are buses used for communication among the blocks. The control bus 208 is mainly used for sending and receiving control signals to and from the control unit 201 to control the operations of each block. The data bus 210 is mainly used to access a work memory 109 used in processing for configuring the point cloud information and generating the encoded data.

Functional Configuration of Reproduction Apparatus

Figure 8:
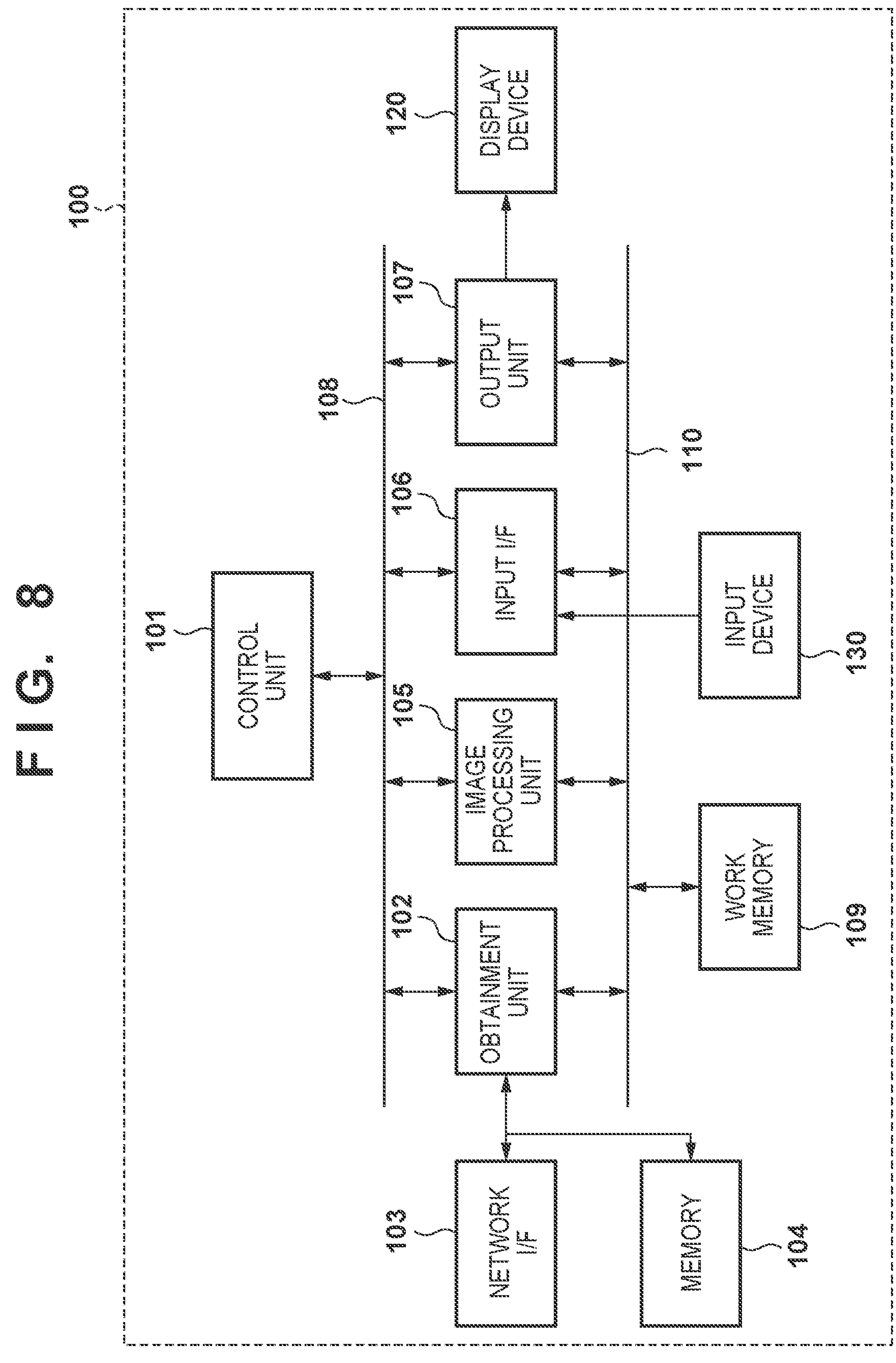
FIG. 8 is a block diagram illustrating an example of the functional configuration of a reproduction apparatus 100 according to embodiments and variations of the present invention.

The functional configuration of the reproduction apparatus 100 according to the present embodiment will be described in detail next with reference to the block diagram in FIG. 8.

A control unit 101 is a control device, such as a CPU, a microprocessor, or the like, that controls the operations of the blocks in the reproduction apparatus 100. The control unit 101 includes a storage device such as a ROM, an HDD, or the like (not shown), and a RAM. The control unit 101 reads out operation programs for each of the blocks, stored in a storage device, for example, loads the programs into the RAM, and executes the programs to control the operations of those blocks.

An obtainment unit 102 obtains encoded data to be reproduced and loads the encoded data into the work memory 109, which is a data storage region for operations and is used for reproduction processing. In the reproduction system according to the present embodiment, the encoded data is received from the generation apparatus 200, and thus the obtainment unit 102 obtains the received encoded data. Data from the generation apparatus 200 is received through a network I/F 103. The network I/F 103 is an interface, provided in the reproduction apparatus 100, for establishing a communication connection with an external device. The network I/F 103 establishes a communication connection with the generation apparatus 200 over the network 350, and receives the encoded data. When the network I/F 103 receives the encoded data, that data is stored in a memory 104. Here, the memory 104 is a storage device such as a volatile memory or the like used for temporary information storage. The obtainment unit 102 therefore obtains the encoded data stored in the memory 104.

The image processing unit 105 performs various types of image processing pertaining to the reproduction of the encoded data. Although details will be given later, the image processing unit 105 executes decoding processing for decoding encoded data loaded into the work memory 109 based on information on the position and attitude of a viewpoint set for reproduction (referred to as a "reproduction viewpoint" hereinafter) or information on a scaling factor for the reproduction. The image processing unit 105 also generates an image resulting from reproducing the encoded data by placing the information obtained from the decoding in the three-dimensional space and rendering the image based on the camera which corresponds to the reproduction viewpoint (i.e., generates a three-dimensional video). Here, the three-dimensional video generated based on the encoded data in which the point cloud information is compressed and encoded is a volumetric video.

An input I/F 106 detects an operation input made through an input device 130, and outputs a corresponding control signal to the control unit 101. In the present embodiment, the input I/F 106 is mainly used for accepting operation inputs pertaining to setting (changing) the reproduction viewpoint and the scaling factor. The input device 130 is a user interface provided in the reproduction apparatus 100, and can include, for example, buttons, a controller, a joystick, or the like provided in a housing of the reproduction apparatus 100, a touch panel for detecting touch operations made on a display device 120, and the like. The reproduction viewpoint may be changed by continuously changing the values of the position, attitude (line of sight direction), and the like of the viewpoint through a continuous analog input, or by selecting a discretely-provided viewpoint. Likewise, the scaling factor may be changed by continuously changing the value of the scaling factor through a continuous analog input, or by selecting a discretely-provided scaling factor.

An output unit 107 displays and outputs the three-dimensional video from the reproduction viewpoint, generated by the image processing unit 105, to the display device 120. The display device 120 may be a display device such as an LCD or the like, for example, and is used to view the encoded data. The display device 120 may be configured as an integral part of the reproduction apparatus 100, or may be provided on the outside of the reproduction apparatus 100 in a removable state.

A control bus 108 and a data bus 110 are buses used for communication among the blocks. The control bus 108 is mainly used for sending and receiving control signals to and from the control unit 101 to control the operations of each block. The data bus 110 is mainly used to access the work memory 109 used in the reproduction processing of the encoded data.

Reproduction of Encoded Data

An overview of the reproduction of the encoded data performed by the reproduction apparatus 100 having such a configuration will be given next.

As described above, the occupancy map information, the geometry information, and the attribute information can be obtained by decoding the encoded data, and the three-dimensional information (a three-dimensional model) of an object pertaining to the point cloud information can be generated from those pieces of two-dimensional information. However, a three-dimensional model for the directions corresponding to each surface of a bounding box for the object is generated from the three types of two-dimensional information, and the three-dimensional models from these six directions are then combined to generate the three-dimensional information of the object. This can result in a high computational load for the processing. In particular, when a plurality of subjects are present in the shooting space and those subjects are included in the encoded data, the three-dimensional information is generated through decoding for all of the subjects, which can lead to excessive amounts of computation.

In contrast, the encoded data is reproduced by placing the three-dimensional information of the object generated in this manner in a three-dimensional space, and generating and displaying a three-dimensional video by rendering the information with the camera corresponding to the reproduction viewpoint. In other words, the form in which the object is rendered changes depending on the reproduction viewpoint which is set. For example, when the region in which the image of the object is displayed in the three-dimensional video is small, the object imparts only a small three-dimensional appearance on the observer. In other words, depending on the reproduction viewpoint that is set, the distance from the reproduction viewpoint to the object being viewed (the viewing distance) may increase, and it may not be possible to provide a three-dimensional appearance to the observer which matches the computational cost required to generate the three-dimensional information through decoding.

Accordingly, the reproduction apparatus 100 according to the present embodiment reduces the computational load involved in the decoding processing by changing the method for decoding the encoded data pertaining to an object, according to the viewing distance from the reproduction viewpoint. As illustrated in FIG. 7, the encoded data includes the occupancy map information, the geometry information, and the attribute information encoded separately within the point cloud-compressed access unit, which makes it possible to decode those instances of two-dimensional information selectively. To generate the three-dimensional information of the object, it is absolutely necessary to decode the geometry information indicating the asperity information. However, as described above, the effect of providing a three-dimensional appearance of the object decreases as the viewing distance increases. This means a three-dimensional video including the object can be generated in a suitable manner even if the object is generated as two-dimensional information without unevenness, the information is applied to a flat object having the same shape, and the object is then arranged in the three-dimensional space so as to face the reproduction viewpoint. In other words, the computational amount can be reduced by employing a configuration in which when the viewing distance exceeds a predetermined distance, two-dimensional information of an object is generated by decoding only the occupancy map information and the attribute information, and not decoding the geometry information, in the decoding processing.

The two-dimensional information of the object that can be generated by decoding only the occupancy map information and the attribute information can simply be a texture of one of the surfaces, such as a texture of the front surface (FR) of the bounding box of the object, for example. In this case, operations such as decoding the two-dimensional information of other surfaces, generating and combining three-dimensional models based on the geometry information, and the like can be omitted.

Incidentally, the viewing distance is not limited to being obtained from an operation input for changing the viewpoint position from which the three-dimensional video is viewed, and can also be changed through an operation input for changing the scaling factor of the three-dimensional video. In other words, a change in the scaling factor provides a viewing experience which is essentially equivalent to that achieved when moving closer to or further away from an object in a three-dimensional video being displayed. Here, in particular, the rate of change may become sharp when the viewing distance is changed through an operation input for changing the scaling factor.

Such an operation input can occur when, for example, judging whether an object included as part of a three-dimensional video is an object which the observer wishes to check in detail (in three dimensions). To be more specific, in such a situation, the observer wishes to judge whether the object in question is a desired object immediately, and the scaling factor is therefore increased sharply to shorten the viewing distance. At this time, if the object is not the desired object, it can be assumed that the observer will sharply reduce the scaling factor to search for the desired object again. In this manner, the viewing distance can be increased or decreased sharply through such a series of operation inputs, and thus even if the three-dimensional information of the object is generated by decoding the geometry information in response to the viewing distance being shortened temporarily, the effect of providing a three-dimensional appearance may be low in the three-dimensional video.

Accordingly, in the reproduction apparatus 100 according to the present embodiment, the decoding processing for the encoded data is changed in accordance with information on the viewing distance from which the encoded data is reproduced and information on an input history of operation inputs for changing the viewing distance.

Functional Configuration Related to Generation of Three-Dimensional Video

Figure 9:
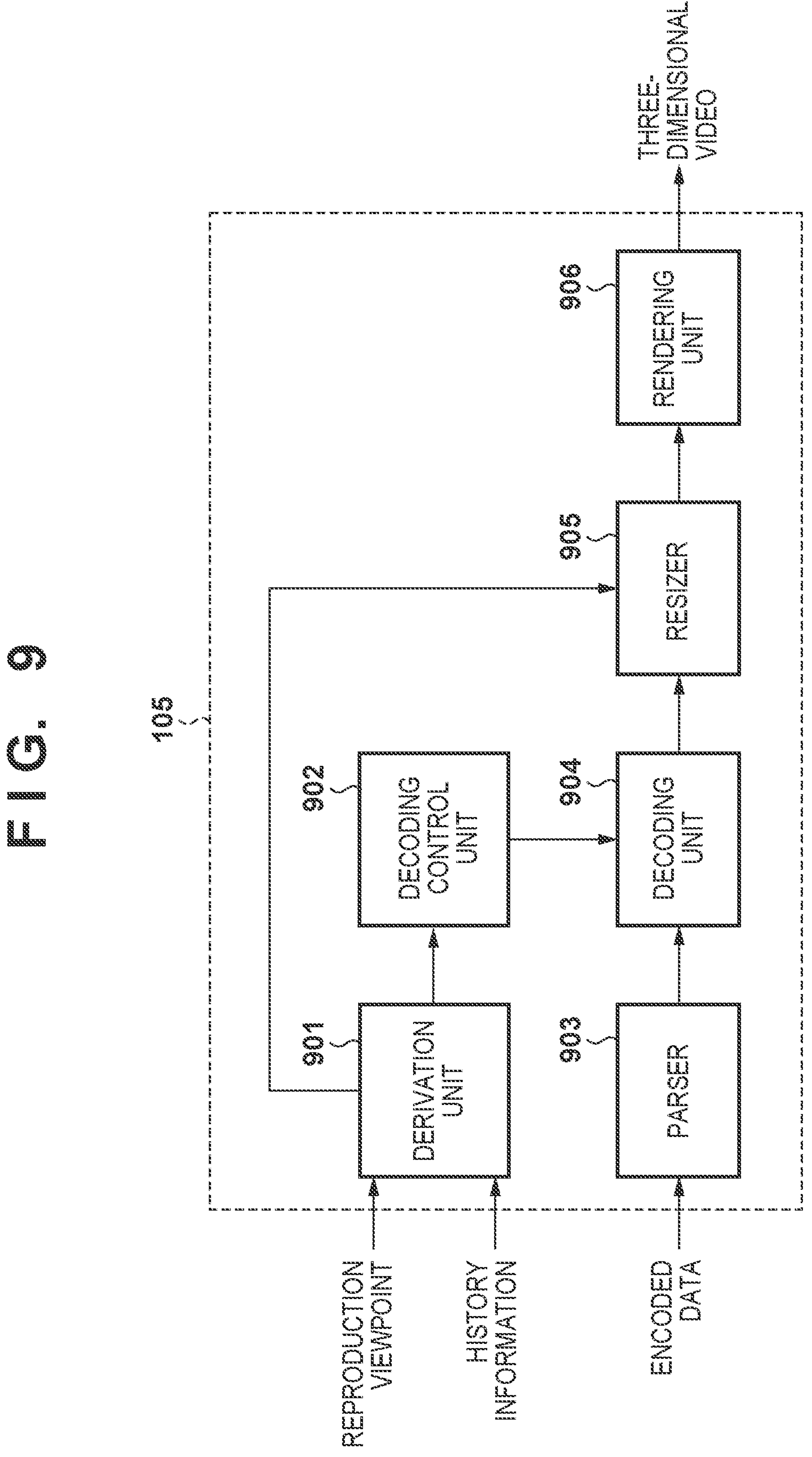
FIG. 9 is a block diagram illustrating an example of a functional configuration of an image processing unit 105, pertaining to the generation of three-dimensional video, according to embodiments and variations of the present invention.

The functional configuration of the image processing unit 105 that executes the three-dimensional video generation processing of the present embodiment will be described in detail next with reference to the block diagram in FIG. 9. As illustrated in FIG. 9, information on the reproduction viewpoint and scaling factor currently set, history information indicating an input history of operation inputs for changing the reproduction viewpoint and scaling factor, and the encoded data loaded into the work memory 109 by the obtainment unit 102 are input to the image processing unit 105. In the present embodiment, a predetermined number of frames' worth of control signals received by the control unit 101 from the input I/F 106 are accumulated in the work memory 109, and that information is used as the history information. Note that to facilitate understanding of the invention, the following will describe the encoded data as being obtained by encoding point cloud information pertaining to a single main subject.

A derivation unit 901 derives a viewing distance for the three-dimensional video to be reproduced, based on the reproduction viewpoint and scaling factor currently set. The viewing distance changes in response to at least one of an operation input for changing the position of the reproduction viewpoint and an operation input for changing the scaling factor of the three-dimensional video.

A decoding control unit 902 controls the decoding processing for the encoded data executed by a decoding unit 904 (described later). As described above, in the present embodiment, the decoding control unit 902 controls the details of the decoding processing based on the information on the viewing distance derived by the derivation unit 901 and the history information which has been input. To be more specific, the decoding control unit 902 determines whether a reproduction condition is satisfied. Here, the reproduction condition is (i) that the viewing distance is less than a predetermined distance (referred to as a "reference viewing distance" hereinafter) and (ii) the rate of change in the most recent viewing distance (in a predetermined number of the most recent frames) is less than a predetermined threshold. When the reproduction condition is satisfied, the decoding control unit 902 causes the decoding unit 904 to execute decoding processing which includes decoding the geometry information, and the three-dimensional information of the object is decoded. However, when the reproduction condition is not satisfied, the decoding control unit 902 causes the decoding unit 904 to execute decoding processing which does not include decoding the geometry information, and the two-dimensional information of the object is decoded.

The reference viewing distance can be set, for example, based on a subject distance, which is a distance from the image capturing apparatus 300 that shot the image used to generate the point cloud information to a main subject. This is based on the understanding that the photographer of the main subject is shooting at a distance where they expect a three-dimensional video to be viewed. It goes without saying, however, that the reference viewing distance is not limited thereto, and may be set based on other criteria.

A parser 903 parses the input encoded data and specifies an address in the encoded data for each piece of information necessary for decoding.

The decoding unit 904 executes the decoding processing on the encoded data and generates information on the object used to generate the three-dimensional video. To be more specific, the decoding unit 904 obtains the necessary information from the encoded data based on the information of the addresses specified by the parser 903, and executes the decoding processing. As described above, the details of the decoding processing executed by the decoding unit 904 is controlled by the decoding control unit 902. The decoding processing performed by the decoding unit 904 is controlled such that the decoding result is different (i.e., is two-dimensional information or three-dimensional information of the object) depending on whether the reproduction condition described above is satisfied. Here, when the reproduction condition is not satisfied, the decoding processing does not include decoding the geometry information and processing for generating a three-dimensional image based on that information, and therefore involves a lower amount of computation than the decoding processing performed when the reproduction condition is satisfied.

A resizer 905 scales the decoding result from the decoding unit 904 based on the information on the scaling factor currently set.

A rendering unit 906 generates and outputs a three-dimensional video corresponding to the encoded data based on the reproduction viewpoint currently set. To be more specific, the rendering unit 906 generates a three-dimensional video (a two-dimensional image to be displayed in the display device 120) by placing the decoding result, following the scaling processing applied by the resizer 905, in the three-dimensional space, and rendering the three-dimensional space using the camera corresponding to the reproduction viewpoint. As described above, the decoding result from the decoding unit 904 is different, i.e., is three-dimensional information or two-dimensional information, depending on whether the reproduction condition is satisfied. When the result is three-dimensional information (a three-dimensional model to which a texture is applied), the rendering unit 906 places that model at a predetermined position in the three-dimensional space. On the other hand, when the result is two-dimensional information (e.g., a two-dimensional image projected onto the front surface of a bounding box), the rendering unit 906 places a flat object of the same shape at a predetermined position in the three-dimensional space, and applies a texture to that flat object. At this time, the attitude of the flat object may be controlled such that the surface to which the texture is applied faces the camera.

Reproduction Processing

Figure 10:
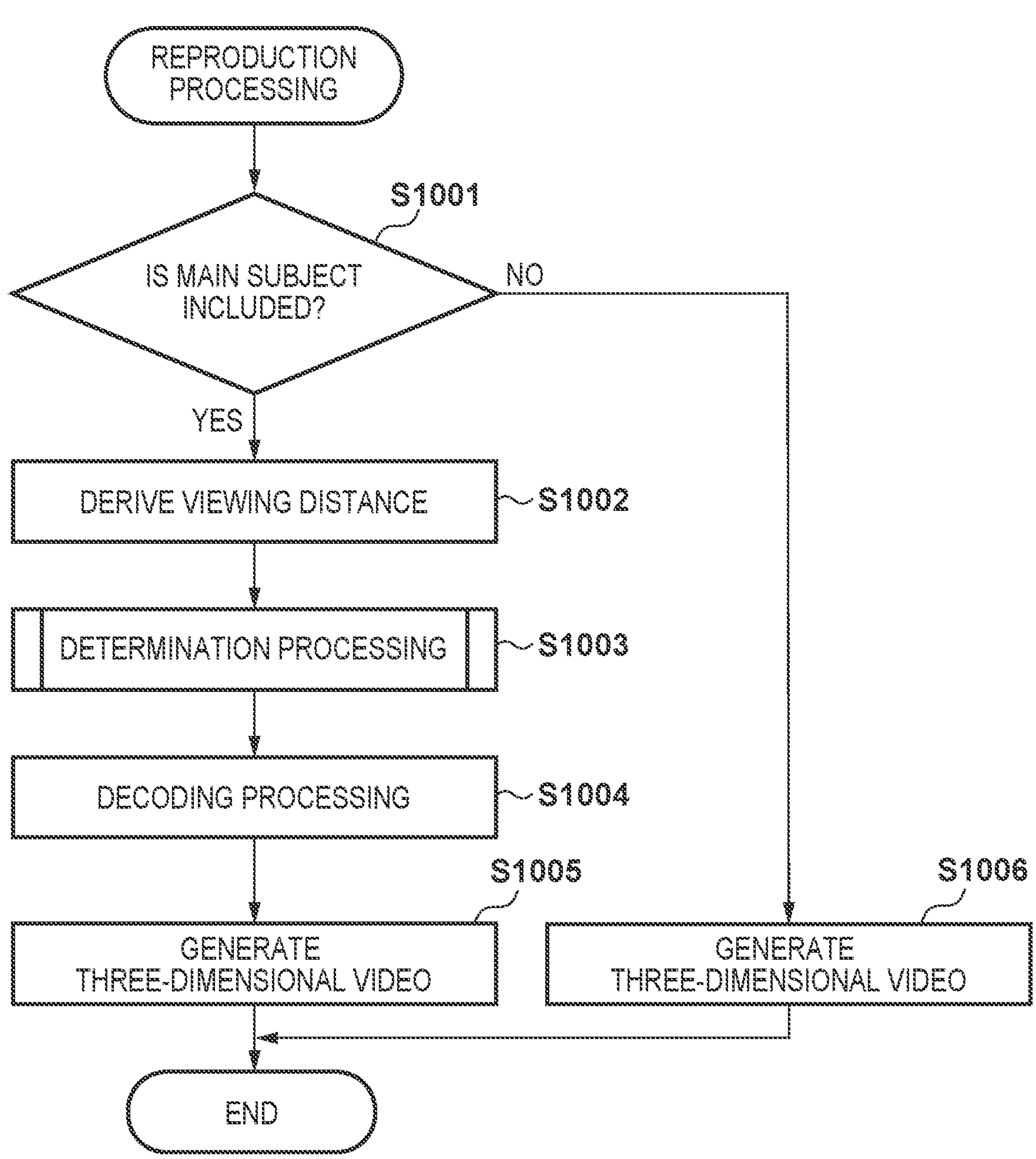
FIG. 10 is a flowchart illustrating an example of reproduction processing executed by the reproduction apparatus 100 according to embodiments and variations of the present invention.

The reproduction processing performed by the reproduction apparatus 100 according to the present embodiment when reproducing the encoded data will be described in detail next with reference to the flowchart in FIG. 10. The processing corresponding to the flowchart can be performed by the image processing unit 105 by, for example, the control unit 101 reading out a corresponding processing program stored in the storage device, loading the program into the RAM, and executing the program. This reproduction processing will be described as being started when encoded data of a single frame is obtained for a point cloud-compressed bitstream (moving image) to be reproduced, for example. This reproduction processing is executed on a frame-by-frame basis.

In step S1001, based on the information on the reproduction viewpoint and scaling factor currently set, the image processing unit 105 determines whether a main subject is included in the three-dimensional video to be generated. In other words, the image processing unit 105 determines whether a space in which an object corresponding to a main subject is to be placed is included in a rendering range of the three-dimensional space, which is defined by the reproduction viewpoint and scaling factor currently set. The sequence moves to step S1002 if the image processing unit 105 determines that the main subject is included in the three-dimensional video to be generated, and to step S1006 if not.

In step S1002, the derivation unit 901 derives the viewing distance (to the main subject) for the three-dimensional video to be reproduced, based on the information on the reproduction viewpoint and scaling factor currently set.

In step S1003, based on the viewing distance derived in step S1002 and the history information that has been input, the decoding control unit 902 executes determination processing for determining the details of the decoding processing to be performed by the decoding unit 904.

Determination Processing

Figure 11:
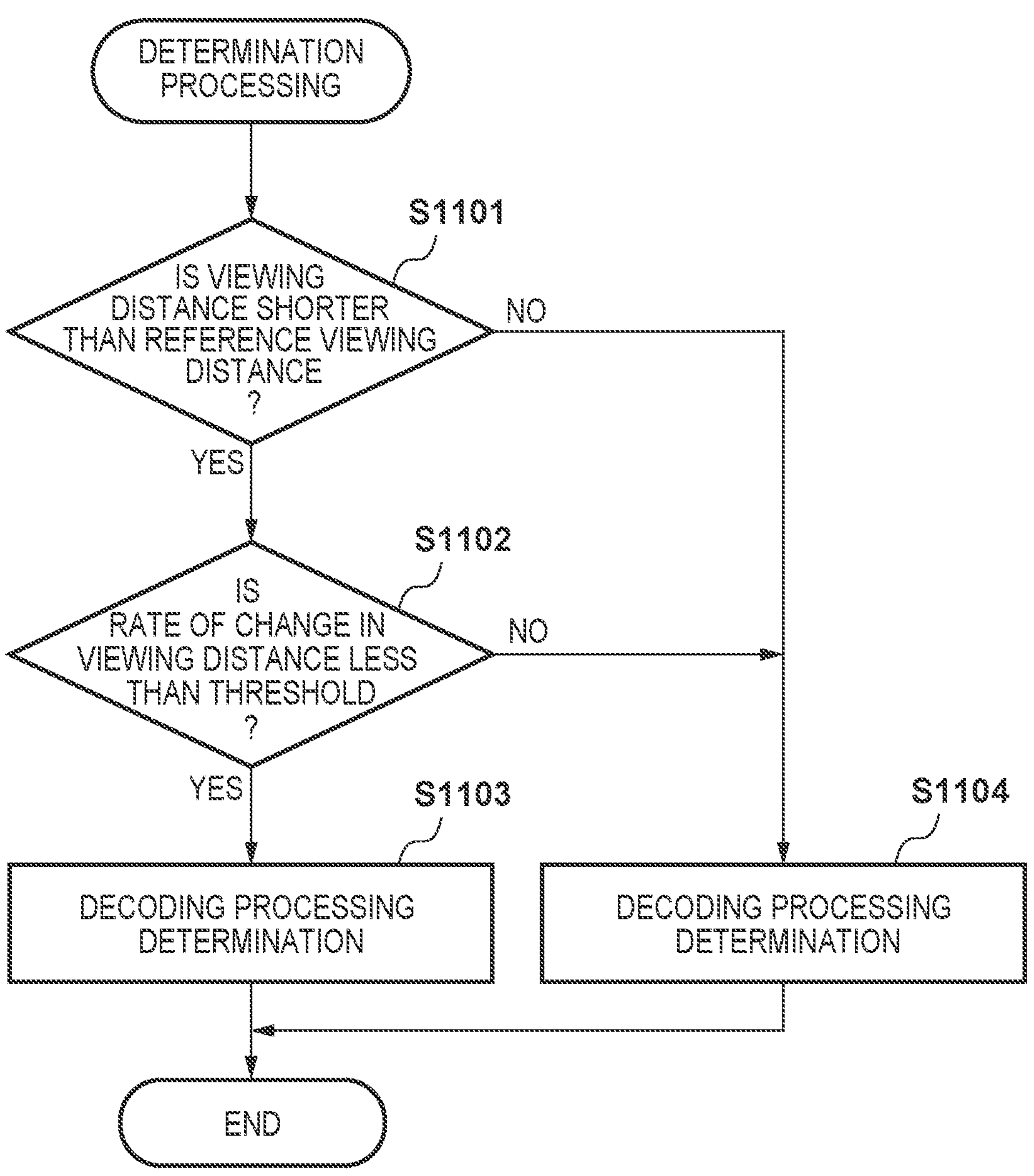
FIG. 11 is a flowchart illustrating an example of determination processing executed by the reproduction apparatus 100 according to a first embodiment of the present invention.

The determination processing executed in this step will be described in detail here with reference to the flowchart in FIG. 11.

In step S1101, the decoding control unit 902 determines whether the viewing distance is shorter than the reference viewing distance. The sequence moves to step S1102 if the decoding control unit 902 determines that the viewing distance is shorter than the reference viewing distance, and to step S1104 if not.

In step S1102, the decoding control unit 902 determines whether the rate of change in the viewing distance over the most recent predetermined number of frames is less than a threshold. The sequence moves to step S1103 if the decoding control unit 902 determines that the rate of change in the viewing distance over the most recent predetermined number of frames is less than the threshold, and to step S1104 if not.

In step S1103, the decoding control unit 902 determines to cause the decoding unit 904 to execute decoding processing which includes decoding the geometry information, and generate three-dimensional information pertaining to the main subject. The determination processing then ends. In other words, the decoding control unit 902 causes the decoding unit 904 to decode the occupancy map information, geometry information, and attribute information corresponding to all surfaces of the bounding box, and generate the three-dimensional information pertaining to the main subject.

Meanwhile, in step S1104, the decoding control unit 902 determines to cause the decoding unit 904 to execute decoding processing which does not include decoding the geometry information, and generate two-dimensional information pertaining to the main subject. The determination processing then ends. Note that the surface of the bounding box for which the corresponding two-dimensional information is to be generated as the two-dimensional information of the main subject may be determined, for example, according to the positional relationship between the reproduction viewpoint (the camera) and the object corresponding to the main subject in the three-dimensional space. For example, two-dimensional information corresponding to the front surface may be determined to be generated when the reproduction viewpoint is in front of the object corresponding to the main subject, and two-dimensional information corresponding to the back surface may be determined to be generated when the reproduction viewpoint is in back of the object.

Once this determination processing is complete, in step S1004, the decoding unit 904 executes the decoding processing in accordance with the details of the determination.

In step S1005, the rendering unit 906 generates a three-dimensional video for the current frame. To be more specific, the rendering unit 906 generates the three-dimensional video by placing the object resulting from the decoding by the decoding unit 904 in the three-dimensional space after applying the resizing performed by the resizer 905, and rendering the space using the camera corresponding to the reproduction viewpoint. This completes the reproduction processing for the current frame. The rendering of the three-dimensional space also includes rendering a background image associated with that space.

If in step S1001 the main subject is determined not to be included in the three-dimensional video, the rendering unit 906 generates a three-dimensional video for the current frame in step S1006. Because the rendering processing performed in this step does not include rendering the object, the rendering unit 906 simply renders a three-dimensional space to which a background image is applied.

In this manner, according to the reproduction apparatus of the present embodiment, the computational load involved in reproduction can be reduced while ensuring a suitable viewing experience when reproducing encoded data in which point cloud information is compressed and encoded. In other words, the computational load involved in the decoding processing can be changed adaptively by performing control to execute decoding processing which refers to geometry information for situations where a three-dimensional appearance should be provided to the observer, and to execute decoding processing which does not refer to geometry information in other situations.

The present embodiment has described the processing as being implemented by hardware such as circuits, processors, and the like corresponding to the blocks included in the reproduction apparatus 100. However, the present invention is not limited thereto, and the processing by the blocks may be implemented by programs that perform the same processing as those blocks.

First Variation

The foregoing embodiment described a form in which the computational load of the decoding processing is changed by referring or not referring to geometry information in the decoding processing according to whether the viewing distance and history information satisfy a reproduction condition. However, the present invention is not limited thereto. For example, the computational load of the decoding processing may be changed by changing the direction of the surface of the referenced bounding box among the occupancy map information, the geometry information, and the attribute information. The three types of information for each direction of the bounding box will be referred to as a "view patch" hereinafter.

For example, the decoding processing may be controlled to generate the three-dimensional information for the main subject by decoding view patches for all (six) directions when the viewing distance and the history information satisfy the reproduction condition, and only decoding the view patches of some directions when the reproduction condition is not satisfied. In other words, the decoding processing is controlled to generate the three-dimensional information for the main subject by referring to view patches in more directions as the degree to which a three-dimensional appearance should be provided to the observer increases. Doing so makes it possible to generate the three-dimensional video at a reduced computational load while adaptively changing the quality of the three-dimensional dimensional information for the main subject according to the degree to which a three-dimensional appearance should be provided to the observer.

Note that such a change in the computational load of the decoding processing is not limited to a form in which the details of the decoding processing are switched only according to whether the reproduction condition is satisfied as in the first embodiment. The change may be made in stages based on the viewing distance and history information.

Determination Processing

An example of the determination processing according to the present variation, in which the computational load of the decoding processing is changed in stages, will be described hereinafter with reference to the flowchart in FIG. 12. Note that steps in the determination processing of the present variation that implement the same processing as in the determination processing of the first embodiment will be given the same reference signs, and will not be described.

If it is determined in step S1102 that the rate of change in the viewing distance over the most recent predetermined number of frames is less than the threshold, in step S1201, the decoding control unit 902 determines whether the viewing distance is stable. To be more specific, the decoding control unit 902 determines whether the amount of change in the viewing distance over the most recent predetermined number of frames falls within a predetermined range of values. The determination in this step can be made simply by determining whether the absolute value of a difference between the viewing distance of the current frame and the viewing distance of the previous frame falls within a predetermined range of values. This corresponds to, for example, a situation in which the observer sharply increases the scaling factor to shorten the viewing distance, confirms that the object in question is the desired object, and continues the viewing at that same viewing distance. In other words, if the viewing distance is stable, the scaling factor will not fluctuate sharply or the like, and thus a three-dimensional appearance of the main subject presented by the three-dimensional video can be increased in stages. The sequence moves to step S1203 if the decoding control unit 902 determines that the viewing distance is stable, and to step S1202 if not.

In step S1202, the decoding control unit 902 determines to cause the decoding unit 904 to execute decoding processing which includes decoding the same information as in the previous frame, and generate three-dimensional information pertaining to the main subject. The determination processing then ends.

On the other hand, if it is determined in step S1201 that the viewing distance is stable, in step S1203, the decoding control unit 902 determines whether the viewing distance is below a predetermined distance shorter than the reference viewing distance. The sequence moves to step S1103 if the decoding control unit 902 determines that the viewing distance is shorter than the predetermined distance, and to step S1204 if not.

In step S1204, the decoding control unit 902 determines to cause the decoding unit 904 to decode the view patch in a predetermined direction, and generate three-dimensional information for the main subject. The determination processing then ends. Here, the view patch in the predetermined direction includes geometry information. The predetermined direction may be any direction or directions of the bounding box as long as all directions are not included, and may be selected from one to five directions.

Figures 13A, 13B, 13C:
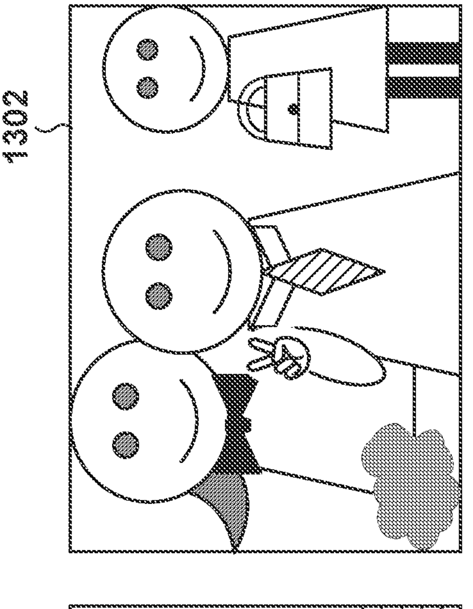
FIGS. 13A, 13B, and 13C are diagrams illustrating an example of the generation of three-dimensional video according to the first variation of the present invention.

Doing so makes it possible to change the computational load of the decoding processing in stages in accordance with the viewing distance and history information. An example of the three-dimensional video generated as a result of the decoding processing in each step of the determination processing of FIG. 12 is illustrated in FIGS. 13A, 13B, and 13C. FIG. 13A illustrates a three-dimensional video 1301 generated in the processing up to step S1104, and only the occupancy map information and the attribute information of the view patch for the front surface (FR) direction are decoded. FIG. 13B illustrates a three-dimensional video 1302 generated in the processing up to step S1204, and view patches for the front surface (FR), the left surface (L), the right surface (R), and the top surface (T) are decoded. FIG. 13C illustrates a three-dimensional video 1303 generated in the processing up to step S1103, and view patches for all directions are decoded.

The flowchart in FIG. 12 illustrates a form in which two types of three-dimensional information for the main subject can be generated, namely when the viewing distance is between the reference viewing distance and the predetermined distance, and when the viewing distance is below the predetermined distance. However, the present invention is not limited thereto. In other words, the configuration may be such that a viewing distance below the reference viewing distance is classified using a finer distance threshold, and three-dimensional information pertaining to three or more types of main subjects can be generated. In this case, control is assumed to be performed such that as the viewing distance decreases, the types of directions of the view patches to be decoded in the decoding processing increase.

Second Variation

Although the foregoing embodiment and variation described the reproduction viewpoint as being changed based on an operation input made using the input device 130, the present invention is not limited thereto. For example, when a head-mounted display (HMD) is used as the display device 120, the reproduction viewpoint may be changed in accordance with the position and attitude of the HMD as opposed to through a manual operation input. In such a form, the viewing distance changes according to the position of the HMD, and the history information indicates a movement history of the position of the HMD. Furthermore, in such a form, the rate of change of the viewing distance can be replaced with a speed of change in the position of the HMD, and for example, the processing up to step S1104 of the determination processing may be controlled to be performed when the speed of change exceeds a predetermined speed.

Second Embodiment

Although the foregoing embodiments and variations described forms in which the viewing distance is derived for the main subject in the encoded data, the present invention is not limited thereto. In other words, in a three-dimensional video in which a plurality of objects can be included, the object from which the viewing distance is derived may be selected based on, for example, the viewing situation of the observer.

When employing an HMD as in the second variation, the line of sight information of the observer can be used to select the object for which the viewing distance is derived, for example. The line of sight information is detected, for example, by a line of sight detection sensor provided within the scope of the HMD. To be more specific, the line of sight detection sensor can detect a position in the three-dimensional video at which the observer is gazing at while viewing the three-dimensional video, and output the coordinates of that position.

Here, when the observer is gazing at an object in the three-dimensional video, it is presumed that the observer wishes to view that object in more detail. In other words, when an object being gazed at is present, it can be assumed that the observer desires a three-dimensional video which provides a three-dimensional appearance for that object.

Accordingly, the viewing distance may be derived based on the object at which the observer is gazing, and the decoding processing may be changed according to that viewing distance. To be more specific, control is performed such that when the viewing distance from the object being gazed at is greater than the reference viewing distance, the number of view patches referred to in the decoding processing is reduced, and the number of view patches referred to increases as the viewing distance decreases. In other words, the determination processing according to the present embodiment controls the details of the decoding processing based on the viewing distance and the line of sight information. Doing so makes it possible to present a three-dimensional video in a suitable form in accordance with the viewing distance and the history information, for at least the object at which the observer is gazing, while reducing the computational load.

In addition, the object from which the viewing distance is derived may be selected based on an operation input made by the observer to select the object in the three-dimensional video displayed in the display device 120.

Third Embodiment

Although the foregoing second embodiment described selecting the object for which the viewing distance is to be derived based on the viewing situation of the three-dimensional video by the observer, the present invention is not limited thereto. The object for which the viewing distance is derived may be selected based on, for example, designation information designating an object included as part of the encoded data.

The object designated by the designation information may be determined, for example, according to a history of the reproduction of the three-dimensional video, based on the same encoded data reproduced by another observer, or based on other encoded data that handles related content. To be more specific, for the history of reproduction by another observer, for example, the number of times a viewing distance has been selected for derivation, a number of time the three-dimensional information has been generated, or the like may be aggregated for each object, and the determination may be made based on the amount thereof. In other words, an object for which three-dimensional information tends to be generated during viewing by another observer can be assumed to be an object likely to catch the observer's interest.

Accordingly, when an object designated by the designation information is placed in a predetermined range from the position of the reproduction viewpoint, selecting that object as an object for which the viewing distance is to be derived and changing the decoding processing according to that viewing distance makes it possible to provide a suitable viewing experience. To be more specific, control is performed such that when the viewing distance from the object designated by the designation information is greater than the reference viewing distance, the number of view patches referred to in the decoding processing is reduced, and the number of view patches referred to increases as the viewing distance decreases. In other words, the determination processing according to the present embodiment controls the details of the decoding processing based on the viewing distance and the designation information. Doing so makes it possible to present a three-dimensional video including an object on which the observer is likely to focus, at a suitable computational load.

In addition, the object designated by the designation information may be determined in advance, for example, by the content producer of the encoded data. Associating information on an object the content producer wishes viewers to focus on as the designation information with the encoded data in advance makes it possible to guide the observer's line of sight when reproducing the encoded data in the reproduction apparatus 100, and can lead to a reduction in the computational load involved in the reproduction.

The designation information may be, for example, associated with the encoded data and received from the generation apparatus 200 along with the encoded data, or may be received from another external device. In the former case, when generating the encoded data of the point cloud information in the generation apparatus 200, information on the reference viewing distance at which the decoding processing is to be switched, and the designation information designating the object for which the viewing distance is to be derived when the reproduction viewpoint approaches, is included as the information pertaining to reproduction of the encoded data. For the information on the reference viewing distance, for example, information on the subject distance received from the image capturing apparatus 300 is obtained, and the designation information is obtained based on the information on an operation input for designating the object, performed separately. According to the encoded data generated in this manner, the computational load of the decoding processing for the object designated at least by the designation information in the reproduction apparatus 100 can be changed adaptively to provide a suitable three-dimensional video viewing experience.

Third Variation

The foregoing embodiments and variations have described forms in which the computational load of the decoding processing is changed by changing the number of view patches referred to in the decoding processing or changing the information referred to from among the three types of two-dimensional information included in the view patches. However, the present invention is not limited thereto, and the computational load of the decoding processing may be changed by changing the spatial resolution of the two-dimensional information referred to in the decoding processing in order to reduce the spatial resolution of the decoding result. To be more specific, when the viewing distance is greater than the reference viewing distance, control is performed such that each type of two-dimensional information in the view patches referred to in the decoding processing is used having thinned the pixels thereof. On the other hand, control is performed such that the amount of pixel thinning in each type of two-dimensional information referred to is reduced as the viewing distance becomes closer than the reference viewing distance. Doing so makes it possible to display objects having a suitable accuracy as three-dimensional video from a reproduction viewpoint where the viewing distance is short, while reducing the computational load involved in the decoding processing.

Fourth Variation

The aforementioned embodiments and variations have basically described increasing or reducing the amount of computation involved in the decoding processing according to the viewing distance. However, depending on the subject in the shot images used to configure the point cloud information, it may not be preferable to display the three-dimensional video in a form that provides a three-dimensional appearance. To be more specific, for example, if the shot image is a group photo, a large number of objects are included in the encoded data. As such, performing decoding processing on each of the plurality of objects to generate the three-dimensional information for those objects can result in an excessive amount of computation. Additionally, for example, if the shot image is a satellite photograph (an aerial photograph), the subject distance may be so long that the asperity information cannot be obtained at a suitable level of accuracy. Therefore, even if the three-dimensional information of an object is decoded and the decoding processing is executed, it may not be possible to provide a suitable three-dimensional appearance. Accordingly, if a result of analyzing the shot image used to configure the point cloud information indicates that the image is a group photograph, a satellite photograph, or the like, the decoding processing may be controlled such that two-dimensional information is generated for each object regardless of the viewing distance.

Conversely, depending on the subject in the shot images, it may not be preferable to display the three-dimensional video in a form that does not provide a three-dimensional appearance. For example, if the images used to configure the point cloud information are close-up images, the images are assumed to have been shot while enlarging the details of the subject to begin with, and it is therefore preferable to view the image at a short viewing distance. Accordingly, if the shooting mode set in the image capturing apparatus 300 when shooting the images used to configure the point cloud image is a macro shooting mode, the decoding processing may be controlled such that three-dimensional information is generated for each object regardless of the viewing distance.

Fifth Variation

Although the foregoing embodiments and variations described a form in which when the viewing distance is short, the three-dimensional information of an object is generated by performing decoding processing which refers to the view patches in all directions included in the encoded data. However, the present invention is not limited thereto. For example, when the computational performance of the reproduction apparatus 100 is low, processing latency may arise when repeatedly executing decoding processing that refers to the view patches in all directions, and it may not be possible to present a suitable three-dimensional video. Accordingly, the determination processing may judge the computational processing by the reproduction apparatus 100, and the decoding processing may be changed according to the computational performance. To be more specific, when the computational performance of the reproduction apparatus 100 is low, control may be performed such that when the viewing distance is close, fewer types of view patches are referenced than when the computational performance is high. In addition, the computational load may be reduced by controlling the reference viewing distance to be shorter as the computational performance decreases.

In addition, for example, in a situation where the reproduction apparatus 100 is powered by a battery, the time for which the encoded data can be reproduced may be reduced when high-load operations are performed. Accordingly, the determination processing may specify a state of the supply of power to the reproduction apparatus 100, and the computational load of the decoding processing that can be executed may be changed according to the state of the supply of power. To be more specific, when the reproduction apparatus 100 is driven by a battery, control may be performed such that when the viewing distance is close, fewer types of view patches are referenced than when the reproduction apparatus 100 is connected to a commercial power source or the like. In addition, the computational load may be reduced by controlling the reference viewing distance to be shorter when the apparatus is driven by a battery.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-070435, filed Apr. 21, 2023, which is hereby incorporated by reference herein in its entirety.

What is claimed is:

1. A reproduction apparatus that reproduces encoded data in which point cloud information pertaining to a pixel distributed in a three-dimensional space is compressed and encoded, the reproduction apparatus comprising:

at least one processor and/or circuit; and at least one memory storing a computer program which causes the at least one processor and/or circuit to:

obtain the encoded data;

obtain information pertaining to reproduction of the encoded data;

execute decoding processing on the encoded data; and generate a three-dimensional video from the encoded data based on a decoding result, wherein the information pertaining to reproduction includes first information pertaining to a viewing distance of the reproduction, and second information different from the first information, the decoding processing is changed according to the first information and the second information obtained, and wherein in executing the decoding processing:

three-dimensional information is generated as the decoding result when the first information and the second information satisfy the predetermined reproduction condition; and two-dimensional information is generated as the decoding result when the first information and the second information do not satisfy the predetermined reproduction condition.

2. The reproduction apparatus according to claim 1, wherein the decoding processing executed when the first information and the second information do not satisfy the predetermined reproduction condition has a lower computation amount than the decoding processing performed when the first information and the second information satisfy the predetermined reproduction condition.

3. The reproduction apparatus according to claim 1, wherein the predetermined reproduction condition includes the viewing distance of the reproduction being below a predefined reference viewing distance for the encoded data.

4. The reproduction apparatus according to claim 3, wherein the point cloud information is information generated based on an image group obtained by shooting a subject from a plurality of viewpoints, and the reference viewing distance is set based on a subject distance in the image group used to generate the point cloud information.

5. The reproduction apparatus according to claim 3, wherein the program further causes the at least one processor and/or circuit to accept a change to the viewing distance of the reproduction, wherein when the change to the viewing distance of the reproduction is accepted, the at least one processor and/or circuit newly obtains the first information and the second information, and the at least one processor and/or circuit controls the decoding processing based on the first information and the second information newly obtained.

6. The reproduction apparatus according to claim 5, wherein the at least one processor and/or circuit changes the viewing distance of the reproduction based on an operation input to change the viewing distance, the operation input being made on an operation input device.

7. The reproduction apparatus according to claim 6, wherein the operation input to change the viewing distance includes at least one of an operation input to change a viewpoint position from which the three-dimensional video is viewed and an operation input to change a scaling factor of the three-dimensional video.

8. The reproduction apparatus according to claim 6, wherein the second information includes an input history of the operation input to change the viewing distance, and the predetermined reproduction condition includes a rate of change of the viewing distance being below a predetermined threshold.

9. The reproduction apparatus according to claim 5, wherein the three-dimensional video is presented in a head-mounted display (HMD), and the at least one processor and/or circuit changes the viewing distance of the reproduction based on a position of the HMD.

10. The reproduction apparatus according to claim 9, wherein the second information includes a movement history of the position of the HMD, and the predetermined reproduction condition further includes a speed of change in the position of the HMD being below a predetermined speed.

11. The reproduction apparatus according to claim 5, wherein the second information includes line of sight information of an observer, the program further causes the at least one processor and/or circuit to detect, based on the line of sight information, that the observer is gazing at an object in the three-dimensional video, the at least one processor and/or circuit changes the viewing distance of the reproduction based on the object detected as being gazed at, the predetermined reproduction condition further includes that the observer is gazing, and when the first information and the second information satisfy the predetermined reproduction condition, the at least one processor and/or circuit changes the decoding processing at least for the object being gazed at by the observer.

12. The reproduction apparatus according to claim 5, wherein the decoding result is an object placed in the three-dimensional space, the at least one processor and/or circuit generates the three-dimensional video by rendering the three-dimensional space based on a viewpoint position of viewing, the second information includes designation information designating an object included as part of the encoded data, and the predetermined reproduction condition further includes that the object designated by the designation information is located in the three-dimensional space within a predetermined range that is based on the viewpoint position of the viewing.

13. The reproduction apparatus according to claim 12, wherein the object designated by the designation information is determined according to a history of reproduction, by another observer, of the three-dimensional video based on the encoded data.

14. The reproduction apparatus according to claim 12, wherein the object designated by the designation information is predefined in association with the encoded data.

15. The reproduction apparatus according to claim 1, wherein in the decoding processing, the at least one processor and/or circuit changes the data, among the encoded data, that is referred to in the decoding processing, according to the first information and the second information.

16. The reproduction apparatus according to claim 15, wherein the encoded data includes partial encoded data in which two-dimensional information is compressed and encoded, the two-dimensional information being information in which the point cloud information is projected in each of a plurality of directions, and the at least one processor and/or circuit changes the direction of the partial encoded data referred to in the decoding processing, according to the first information and the second information.

17. The reproduction apparatus according to claim 15, wherein the encoded data includes a plurality of types of partial encoded data in which the point cloud information is classified into a plurality of types of two-dimensional information, and is compressed and encoded, and the at least one processor and/or circuit changes the type of the partial encoded data referred to in the decoding processing, according to the first information and the second information.

18. The reproduction apparatus according to claim 17, wherein the partial encoded data includes geometry information, and the at least one processor and/or circuit changes whether or not to refer to the geometry information in the decoding processing, according to the first information and the second information.

19. The reproduction apparatus according to claim 1, wherein the at least one processor and/or circuit changes a spatial resolution of the decoding result, according to the first information and the second information.

20. The reproduction apparatus according to claim 1, wherein the point cloud information is information generated based on an image group obtained by shooting a subject from a plurality of viewpoints, and the at least one processor and/or circuit further changes the decoding processing according to a shooting mode in which the image group used to generate the point cloud information was shot.

21. The reproduction apparatus according to claim 1, wherein the point cloud information is information generated based on an image group obtained by shooting a subject from a plurality of viewpoints, the program further causes the at least one processor and/or circuit to judge a subject pertaining to the encoded data, and the at least one processor and/or circuit further changes the decoding processing according to a judgment result.

22. The reproduction apparatus according to claim 1, wherein the program further causes the at least one processor and/or circuit to judge a computational performance of the reproduction apparatus, and the at least one processor and/or circuit further changes the decoding processing according to the computational performance of the reproduction apparatus.

23. The reproduction apparatus according to claim 1, wherein the program further causes the at least one processor and/or circuit to determine a state of a supply of power to the reproduction apparatus, and the at least one processor and/or circuit further changes the decoding processing according to the state of the supply of power to the reproduction apparatus.

24. A method for controlling a reproduction apparatus that reproduces encoded data in which point cloud information pertaining to a pixel distributed in a three-dimensional space is compressed and encoded, the method comprising:

obtaining the encoded data;

obtaining information pertaining to reproduction of the encoded data;

executing decoding processing on the encoded data; and generating three-dimensional video from the encoded data based on a decoding result, wherein the information pertaining to reproduction includes first information pertaining to a viewing distance of the reproduction, and second information different from the first information, the decoding processing is changed according to the first information and the second information obtained, and wherein in executing of the decoding processing:

three-dimensional information is generated as the decoding result when the first information and the second information satisfy the predetermined reproduction condition; and two-dimensional information is generated as the decoding result when the first information and the second information do not satisfy the predetermined reproduction condition.

25. A computer-readable recording medium on which is recorded a program for causing a computer to execute the method of controlling a reproduction apparatus according to claim 24.

* * * * *